United States Patent [19]

Takeda

[11] Patent Number: 5,535,388

[45] Date of Patent: Jul. 9, 1996

[54] APPARATUS FOR DYNAMICALLY COLLECTING AND EDITING MANAGEMENT INFORMATION DURING A SOFTWARE DEVELOPMENT PROCESS

[75] Inventor: Shigeru Takeda, Tokyo, Japan

[73] Assignee: Hitachi, Ltd., Tokyo, Japan

[21] Appl. No.: 257,934

[22] Filed: Jun. 9, 1994

Related U.S. Application Data

[63] Continuation of Ser. No. 926,342, Aug. 6, 1992, abandoned.

[30] Foreign Application Priority Data

Aug. 21, 1991 [JP] Japan ................................. 3-234038

[51] Int. Cl.$^6$ .................................................. G06F 9/44
[52] U.S. Cl. .................... 395/650; 364/DIG. 1; 364/280.4; 364/281.3
[58] Field of Search ............................ 395/650, 700

[56] References Cited

U.S. PATENT DOCUMENTS

| | | | |
|---|---|---|---|
| 3,740,759 | 6/1973 | McKeegan et al. | 346/44 |
| 3,815,104 | 6/1974 | Goldman | 340/172.5 |
| 3,838,396 | 9/1974 | Martin | 340/172.5 |
| 4,432,051 | 2/1984 | Bogaert et al. | 364/200 |
| 4,536,646 | 8/1985 | Adams et al. | 235/377 |
| 4,751,635 | 6/1988 | Kret | 364/200 |
| 4,853,873 | 8/1989 | Tsuji | 364/513 |

FOREIGN PATENT DOCUMENTS 61-194532  8/1986  Japan .

OTHER PUBLICATIONS

Baker, Mark D., "Implementing an Initial Software Metries Program", Modern Technologies Corp., 1991 IEEE.

*Primary Examiner*—Kevin A. Kriess
*Attorney, Agent, or Firm*—Fay, Sharpe, Beall, Fagan, Minnich & McKee

[57] ABSTRACT

A process managing apparatus in a computer system for supporting an information processing system development. This process managing apparatus comprises a combination defining information storing unit for storing information defining a predetermined combination of process management information for managing processes of the information processing system development; a process management information acquiring unit for acquiring process management information in accordance with a process for creating specifications such as drawings and documents; and process management information editing unit for selecting and editing predetermined process management information from among said acquired process management information on the basis of said combination defining information.

2 Claims, 6 Drawing Sheets

FIG. 3A

| 21 | 22 | 23 | 24 |
|---|---|---|---|
| SPECIFICATION CREATOR | WORKING DATE | WORKING HOURS | COMPLETE-NESS |
| TARO NIHON | 90/04/20 | 01:30 | 80 |

FIG. 3B

| SPECIFICATION | DATA ITEM TABLE |
|---|---|
| OPERATOR | TARO HITACHI |
| WORKING DATE | 920701 |
| WORKING HOUR | 1.5 |
| WORKING AMOUNT | 3 |
| COMPLETENESS | 80 |
| TIMES OF MODIFICATION | 2 |

FIG. 4A

| SPECIFI-CATION NAME | OPERATOR | WORKING DATE | WORKING HOUR | WORKING AMOUNT | COMPLETE-NESS | TIMES OF MODIFI-CATIONS |
|---|---|---|---|---|---|---|
| DATA ITEM TABLE | O | 1 | 1 h | 1 PAGE | 1 % | 0 |

FIG. 4B

| NETWORK NAME | HOST NAME | DIRECTORY NAME | FILE NAME | FILE SYSTEM |
|---|---|---|---|---|
| net 1 | host 1 | dir 1 | file 1 | /dev/hd1o |

| INTERVAL | TIME |
|---|---|
| DAY | 9:00 |

5,535,388

APPARATUS FOR DYNAMICALLY COLLECTING AND EDITING MANAGEMENT INFORMATION DURING A SOFTWARE DEVELOPMENT PROCESS

This is a continuation of U.S. application Ser. No. 07/926,342, filed Aug. 6, 1992, now abandoned.

BACKGROUND OF THE INVENTION

The present invention relates to a process management in a information processing system development, and more particularly to a method and apparatus for automatically acquiring and editing process management information in a computer system which supports an information processing system development.

As a known prior art automation of process management in an information processing system development, in a software development, for example, as described in JP-A-61-194532, actual results of works are mechanically read from the number of lines of programs created by respective programmers and stored into a storage unit as process management information. Then, a process manager refers to the storage unit to know a software development situation.

The above-mentioned prior art process management system, however, implies the following problems:

(1) Since process management information is extracted by counting the number of lines included in developed programs, it is not possible to collect process management information when creating documents such as specifications which may be generated in an information processing system development other than programs;

(2) The kinds of automatically collectable process management information are fixed, and therefore the process manager cannot specify them;

(3) Since collected process management information is to be destined to a predetermined storage unit, a destination storage unit cannot be freely specified; and (4) Collected process management information is to be stored at a fixed time, so that a process manager cannot freely set a required time.

SUMMARY OF THE INVENTION

It is an object of the present invention to provide a method and apparatus for managing processes in an information processing system development which is capable of solving the foregoing problems of the prior art.

To achieve the above object, according to the present invention, there is provided a process managing apparatus for use in a computer system which supports an information processing system development comprising means for storing information defining a combination of process management information; means for acquiring process management information in accordance with the creation of specifications such as drawings, documents and so on; and means for selecting and editing desired process management information from among the acquired process management information on the basis of the defining information.

Also, in the present invention, means for storing information defining a destination for storing process management information is provided so as to store edited process management information into a desired destination storage unit.

Further, means for storing information defining a storing time of the process management information is provided so as to store the edited process management information into a desired destination storage unit at a desired time.

The present invention allows the process manager to automatically acquire and edit necessary process management information corresponding to the creation of individual specifications such as drawings and documents which are generated in an information processing system development. Further, edited process management information can be stored into a storage unit convenient to the process manager at a convenient time and made available at any time.

BRIEF DESCRIPTION OF THE DRAWINGS

FIGS. 3A and 3B are tables respectively showing an example of editing results;

FIGS. 4A and 4B are tables respectively showing examples of combination defining information and destination storage unit defining information of process management information;

DESCRIPTION OF THE PREFERRED EMBODIMENTS

An embodiment of the present invention will hereinafter be described in detail in connection with an embodiment with reference to the accompanying drawings.

Figure 2:
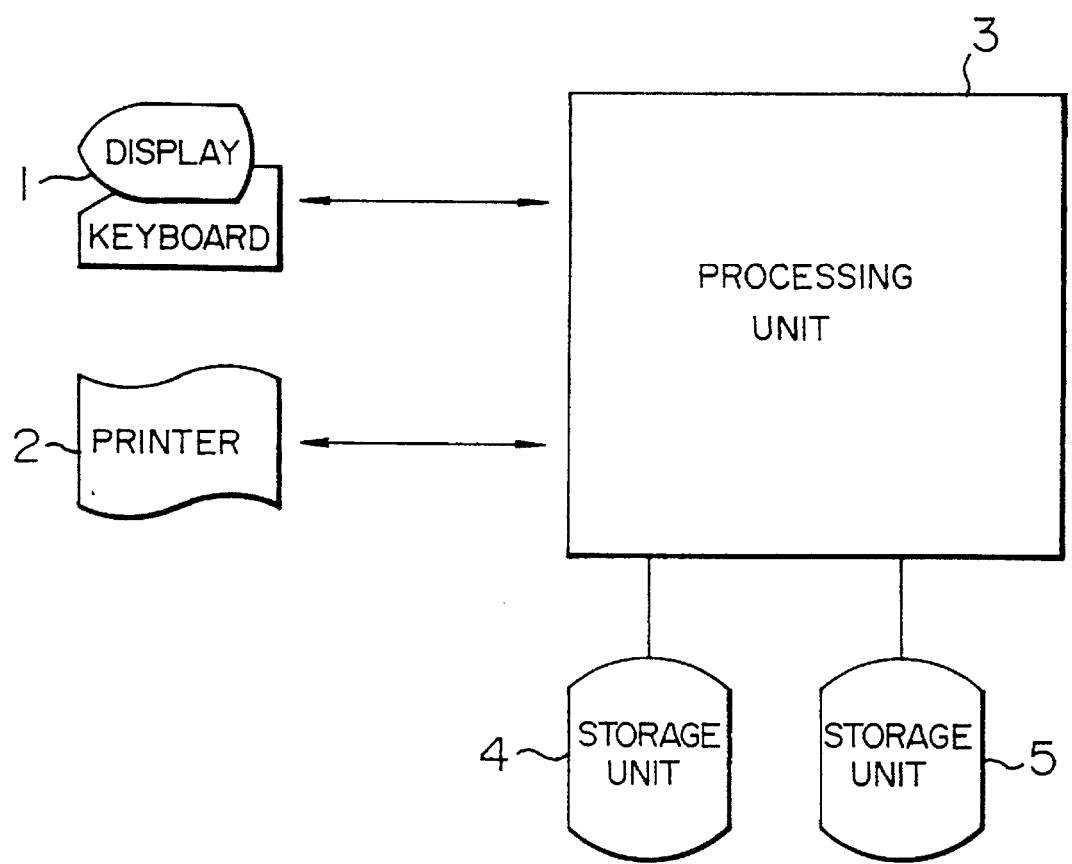
FIG. 2 is a diagram showing the whole arrangement of a software developing apparatus which embodies the architecture of FIG. 1.

FIG. 2 shows the architectural diagram of a computer system for supporting an information processing system development which constitutes an embodiment of the present invention. In FIG. 2, reference numeral 1 designates a keyboard-display unit through which a process manager inputs and outputs information necessary to a process management and an operator creates specifications and so on in an interactive manner. Although omitted in the drawing, the keyboard-display unit 1 also includes a mouse. Reference numeral 2 designates a printer for printing outputs such as specifications and process management information. Reference numeral 3 designates a processing unit comprised of a CPU, a main memory and so on, which is also provided with a specification creating unit, a process management information acquiring and editing unit as functions related to the present invention. The architecture of the processing unit 3 will be later referred to. Reference numeral 4 designates a storage unit for storing created specifications; and 5 another storage unit for storing acquired and edited process management information.

First, description will be made to process management information which is an object of the present embodiment. The process management information as referred to in the present embodiment includes the following items:

(1) Work Object

Names of specifications generated in an information processing system development such as a system flow, a document format, a data item table, a flow chart and so on which are objects to be worked by the operator;

(2) Operator

The name of an operator who creates specifications, or an identifier for specifying an individual operator or a group of operators;

(3) Working Date

The date on which the operator worked on specifications;

(4) Working Hours

Start and end times of a work, or hours required for the work;

(5) Working Amount

Values for informing a working amount such as a number of pages when terminating the creation of specifications, an amount of item descriptions, a data amount, a number of characters, and so on; and (6) Others Information necessary to the process management such as a completeness as a ratio of a number of inscribed items to a number of total pages of specifications, a number of modifications made to the specifications, and so on.

Figure 1:
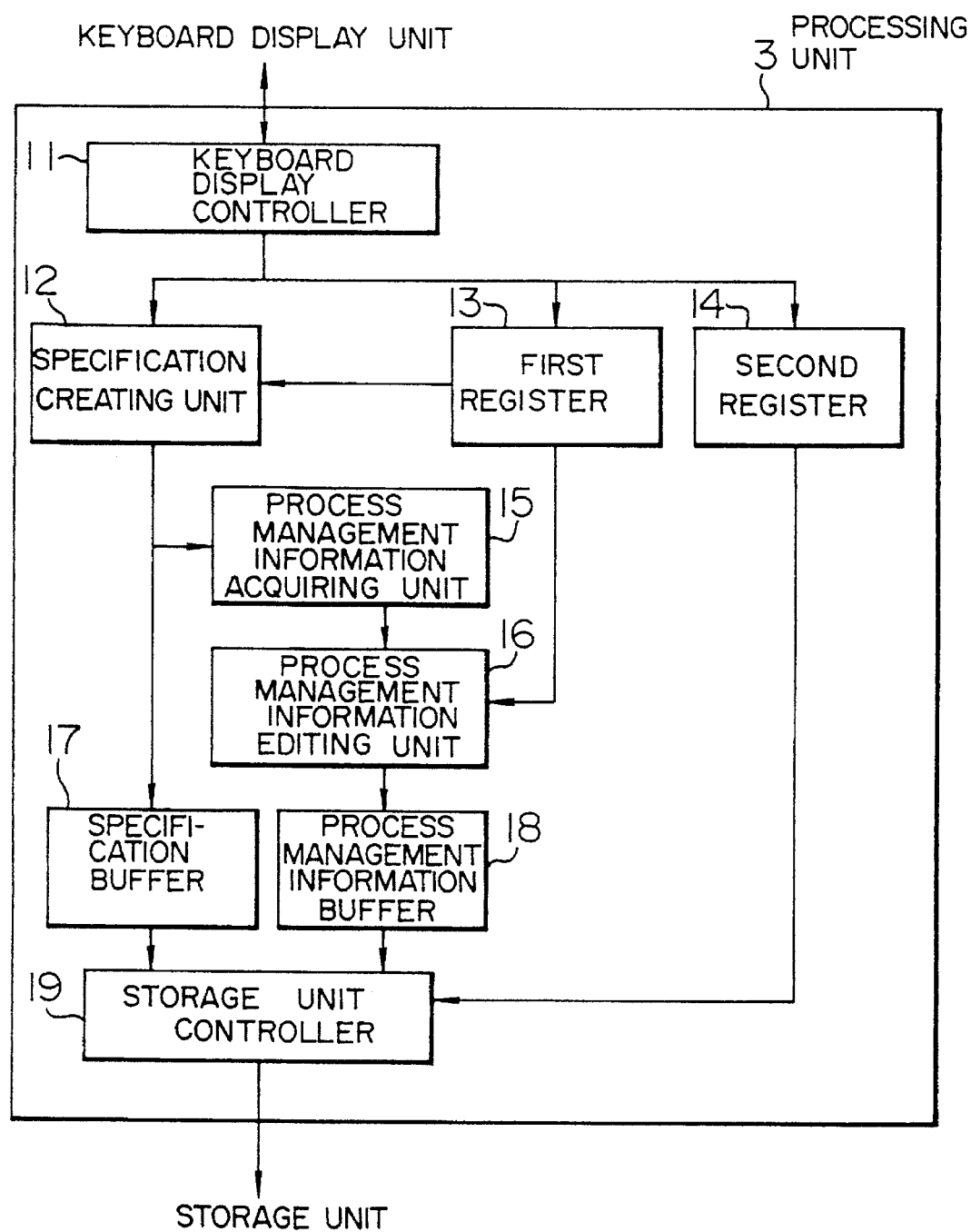
FIG. 1 is a diagram showing the architecture of an embodiment of the present invention.

FIG. 1 shows an embodiment of the architecture related to the process managing apparatus of the present invention in the processing unit 3. In FIG. 1, reference numeral 11 designates a keyboard-display controller for controlling input and output of necessary information with the keyboard-display unit 1; 12 a specification creating unit for creating specifications interactively with the operator; 13 a first register for storing information defining a combination of process management information which must be acquired; 14 a second register for storing information defining a destination for storing edited process management information; 15 a process management information acquiring unit for acquiring process management information from specifications created by the specification creating unit 12 and so on; 16 a process management information editing unit for combining and editing the process management information acquired by the process management information acquiring unit 15 on the basis of the defining information stored in the first register 13; 17 a specification buffer for temporarily storing specifications created by the specification creating unit 12; 18 a process management information buffer for temporarily storing process management information edited by the process management information editing unit 16; and 19 a storage unit controller for outputting specifications buffered in the specification buffer 17 into the storage unit 4 and for outputting process management information buffered in the process management information buffer 18 into the storage unit 5 and other storage units on the basis of the defining information stored in the second register 14.

Next, the operation of the embodiment of the process managing apparatus according to the present invention will be described with reference to FIGS. 1 and 2.

Prior to the start of a specification creating work by the operator, the process manager inputs from the keyboard-display unit 1 combination defining information for process management information which must be acquired, such as the name of a specification creator; the working date; working hours; a completeness and so on. This combination defining information for the process management information is set and registered in the first register 13 through the display-keyboard controller 11. Further, the process manager inputs information defining a destination for storing the process management information from the keyboard-display unit 1. This information is set and registered in the second register 14. FIGS. 4A and 4B show examples of stored combination defining information and destination storage unit defining information.

Figure 5:
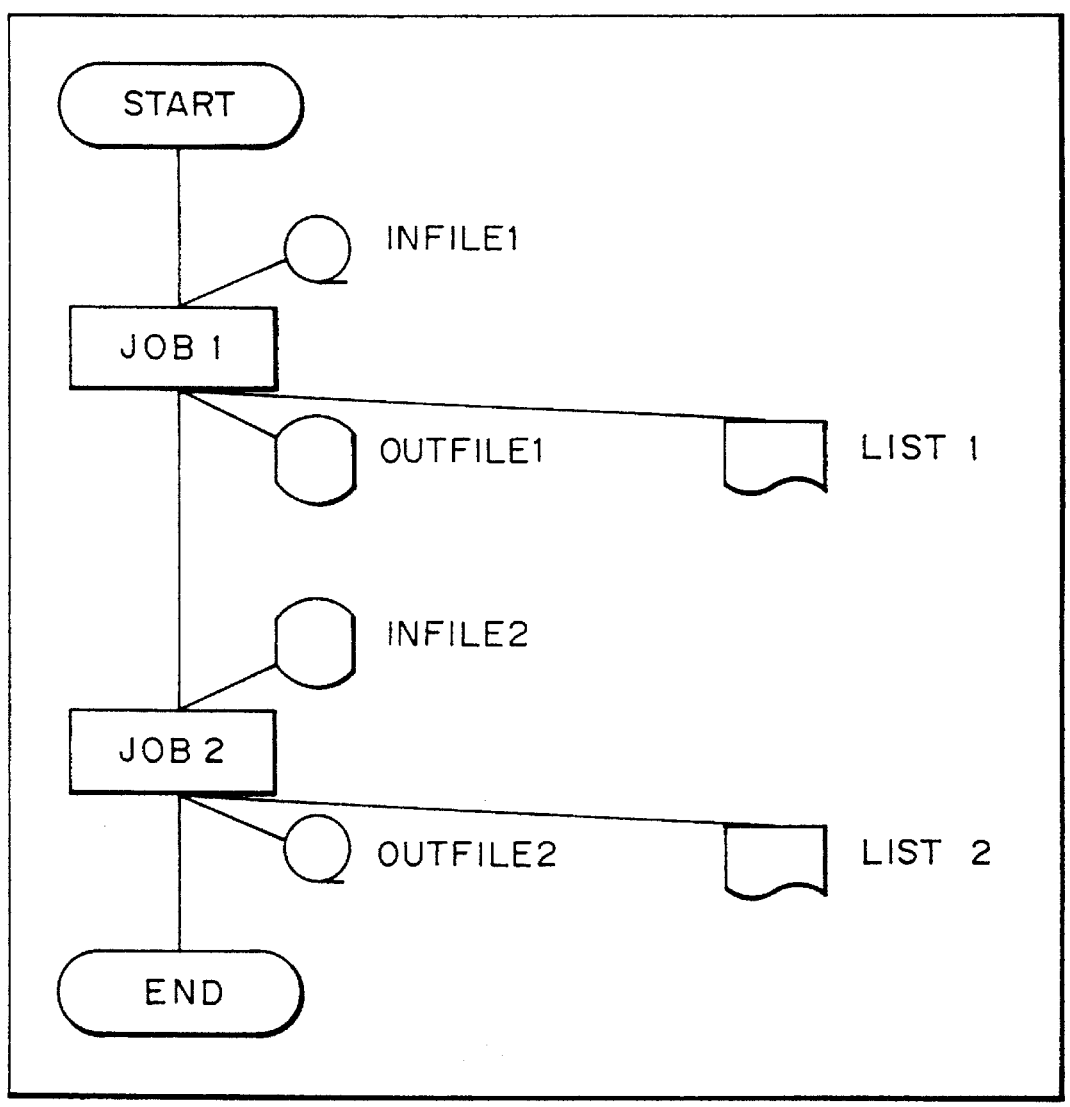
FIG. 5 is a diagram showing an example of editing results.

After the foregoing preset registration work carried out by the process manager, the operator executes a specification creating work by using the keyboard-display unit 1. In this event, the specification creating unit 12 fetches commands, data and so on entered by the operator through the keyboard-display controller 11, creates specifications, and stores them into the specification buffer 17. The specifications to be created includes a system flow diagram, a document format, a data item table, a program transition diagram, and so on. FIG. 5 shows a program transition diagram as an example of the specifications created in an information processing system development.

The process management information acquiring unit 15 monitors an operating situation of the specification creating unit 12 to acquire a period of time from the start to the end of the operation performed by specification creating unit 12, i.e., a specification creating time. The process management information acquiring unit 15 further acquires other necessary information such as the creator's name, the working date, and so on included in the specifications at the beginning of the operation, during the operation, and at the end of the operation of the specification creating unit 12.

The specification creating unit 12 automatically outputs, during its operation in progress, bibliographical items such as "specification name", "operator", "working date", "working hours" and so on to the process management information acquiring unit 15. The specification creating unit 12 is also constructed to fetch items in arbitrarily specified combination defining information such as "working amount", "completeness", "number of modification" and so on, which are stored in the first register 13, and also input these items in the process management information acquiring unit 15.

Then, when the specification creating work has been finished, the process management information acquiring unit 15 passes the acquired process management information to the process management information editing unit 16. The process management information editing unit 16 selectively combines and edits desired information from among the process management information acquired by the process management information acquiring unit 15 on the basis of combination defining information for process management information set in the first register 13, and stores the results into the process management information buffer 18. FIG. 3A shows a specific example of editing results, wherein reference numeral 21 designates an operator's name or identifier storing column; 22 a working date storing column; 23 a working hours storing column; and 24 a column for storing a completeness as a ratio expressed in percent of inscribed items to necessary items to be inscribed in the whole specifications. FIG. 3B shows another example of editing results similarly to FIG. 3A.

The storage unit controller 19 stores specifications in the specification buffer 17 into the storage unit 4 as well as process management information in the process management information buffer 18 into a desired storage unit on the basis of information defining a destination for storing the process management information set in the second register 14. As such a destination for the process management information, there may be a hard disk drive built in the processing unit 3, or an external flexible disk drive, magnetic tape drive and so on. The storage unit 5 in FIG. 2 shows one of these possible storage units.

As described above, once the process manger registers combination defining information for process management information and information defining a destination for storing the process management information, the process management information is automatically acquired every time the operator executes a specification creating work. Then, necessary process management information is selected therefrom, combined and edited, and stored into a desired storage unit. If the process manager uses this storage unit to output the process management information to the keyboard-display unit 1 and the printer 2, the progress of an information processing system development can be known.

Figures 6A, 6B:
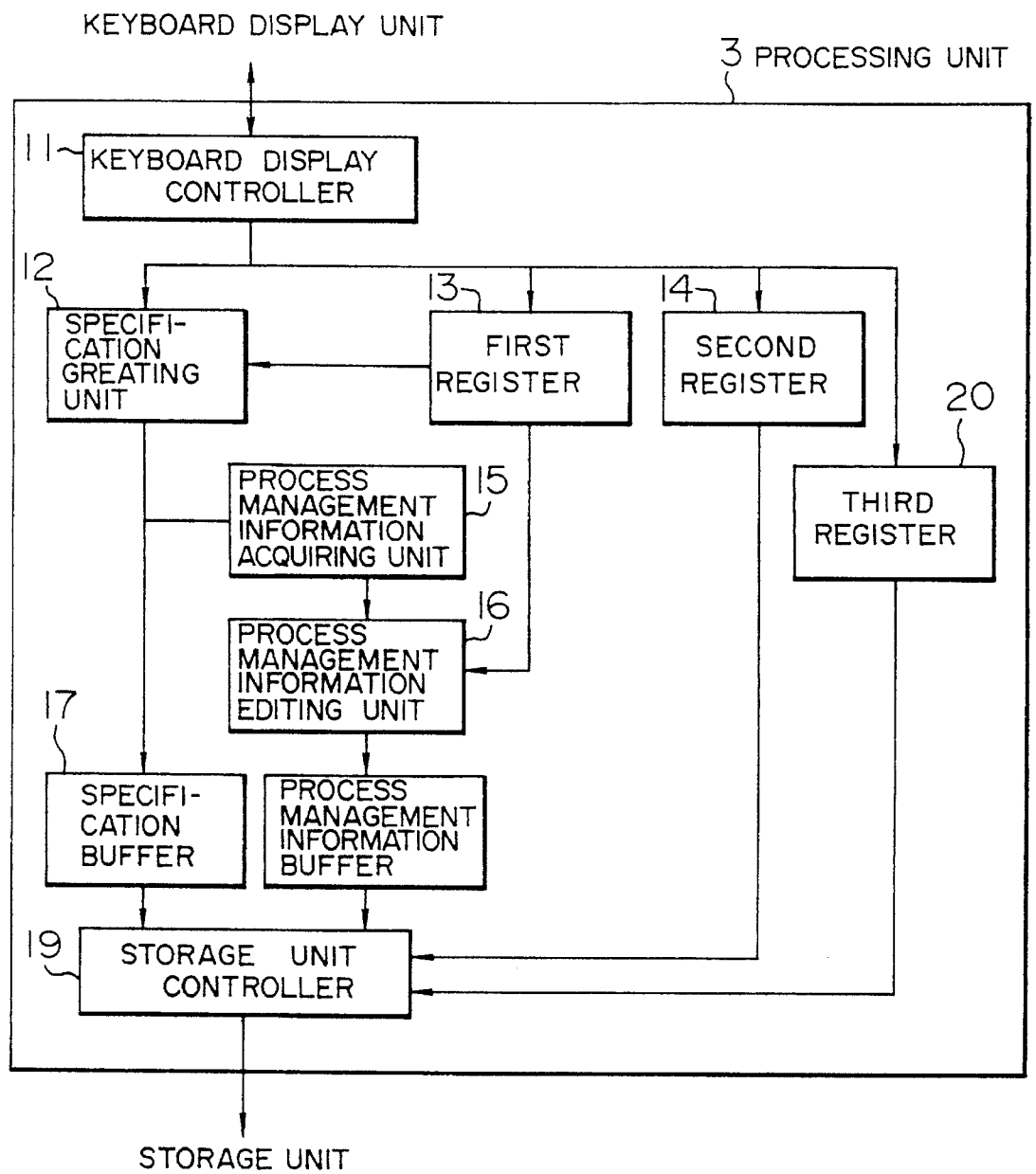
FIGS. 6A and 6B are diagrams showing another embodiment.

FIG. 6A is a diagram showing the structure of the processing unit 3 according to another embodiment. FIG. 6A adds to the architecture shown in FIG. 1 a third register 20 for storing information defining a storing time of process management information. The rest of the architecture is the same as that of FIG. 1. The process manager, when inputting combination defining information for process management information and information defining a destination for storing the process management information through the keyboard-display unit 1, simultaneously inputs storing time defining information for process management information indicating when edited process management information is written into a destination storage unit. This storing time defining information includes, for example, an operation terminating time of the specification creating unit 12, a next operation start time of the specification creating unit 12, a particular time on every Monday, and so on. FIG. 6B shows an example of the storing time defining information. The inputted storing time defining information for process management information is set and registered in the third register 20 through the keyboard-display controller 11. The storage unit controller 19 stores the process management information in the process management information buffer 16 into a predefined storage unit at a predefined time of a predefined day on the basis of defining information in the second and third registers 14 and 20. This function allows the process manager to obtain necessary process management information at a necessary time.

What is claimed is:

1. An apparatus for collecting management information concurrently while a plurality of operators create and develop computer programs and specification documents which describe aspects of said computer programs, the apparatus comprising:

storage means for designating sets of management information data items to be collected, said management information data items including an identification of each specification document, a name of each operator that works on each specification documents date and hour information indicating time period and amounts of work performed producing each specification document, and editing rules for editing said collected management information data items into selected formats;

a destination storing means for storing destination storage unit information which specifies a locations for said management information data items to be stored in a plurality of destination storage units;

a specification means for outputting (i) said generated specification documents as well as (ii) said sets of said management information data items designated by said storage means concurrently while said operators are creating said specification documents;

a management information acquiring means for monitoring said specification means and collecting said sets of said management information data items output by said specification means;

a management information editing means for editing said management information data items collected by said management information acquiring means in accordance with said editing rules stored in said storage means, said management information editing means storing said management information data items in said destination storage units periodically; and a storing time means for defining times at which said management information editing means stores edited management information data items in said destination storage units, said storing time means being connected with at least one of said destination storage units and said management information editing means such that said timing means enables said management information editing means to store said management information data items in said destination storage units at said designated storing times.

2. A time accounting method for accounting for computer programmers' time spent creating and developing computer programs and specification documents therefor, the method comprising:

storing a designation of a set of management information data items to be collected, which said data items include:

an identification of each created program and specification document, a name of each operator that works on each of said computer programs and each of said specification documents, time periods when said work was performed on each of said computer programs and each of said specification documents, and an amount of work performed on each of said programs and each of said specification documents;

with a plurality of operators creating and developing computer programs and specification documents on an information processing system;

concurrently while each said operator is creating and developing one of said specification documents on said information processing system, monitoring said information processing system and during said creating and developing, acquiring said management information data items including the name of each operator, each time period, and each amount of work performed, and acquiring an identification of each of said created and developed specification documents;

concurrently while each said operator is creating and developing one of said programs on said information processing system, monitoring said information processing system and during said creating and developing, acquiring said management information data items including the name of each operator, each time period, and each amount of work performed, and acquiring an identification of each of said created and developed programs;

storing said acquired data items in computer memory;

reformatting said management information data items stored for the plurality of said operators, said programs, and said specification documents in accordance with preselected process manager defined format rules;

storing said formatted management information data items in a plurality of computer storage units in accordance with a storage location designated for each management information data item;

storing a plurality of designated storage times for storing said management information data items in said computer storage unit; and storing said management information data items in said storage units at said designated storage times.

* * * * *